(12) United States Patent
Matsunobu et al.

(10) Patent No.: US 11,652,259 B2
(45) Date of Patent: May 16, 2023

(54) METHOD FOR PRODUCING SEPARATOR-INTEGRATED ELECTRODE

(71) Applicant: TOYOTA JIDOSHA KABUSHIKI KAISHA, Toyota (JP)

(72) Inventors: Kohei Matsunobu, Toyota (JP); Akio Minakuchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 17/182,735

(22) Filed: Feb. 23, 2021

(65) Prior Publication Data

US 2021/0296730 A1 Sep. 23, 2021

(30) Foreign Application Priority Data

Mar. 18, 2020 (JP) .............................. JP2020-047783

(51) Int. Cl.
*H01M 50/403* (2021.01)
*H01M 50/46* (2021.01)

(52) U.S. Cl.
CPC ......... *H01M 50/403* (2021.01); *H01M 50/46* (2021.01)

(58) Field of Classification Search
CPC .............. H01M 4/139; H01M 4/1393; H01M 10/4235; H01M 50/403; H01M 50/411; H01M 50/414; H01M 50/46; H01M 2004/027
See application file for complete search history.

(56) References Cited

U.S. PATENT DOCUMENTS

| 6,464,351 B1* | 10/2002 | Landry-Coltrain ...... B41M 5/52 428/32.26 |
| 2015/0306539 A1* | 10/2015 | Yamato ................. B32B 27/281 210/490 |
| 2018/0175353 A1 | 6/2018 | Sakimoto et al. |

(Continued)

FOREIGN PATENT DOCUMENTS

| CN | 106299209 A | 1/2017 |
| JP | 10-116630 A | 5/1998 |

(Continued)

OTHER PUBLICATIONS

U.S. Appl. No. 16/998,664, filed Aug. 20, 2020, Matsunobu et al.
U.S. Appl. No. 17/066,063, filed Oct. 8, 2020, Matsunobu et al.
U.S. Appl. No. 17/134,657, filed Dec. 28, 2020, Matsunobu et al.

*Primary Examiner* — Ula C Ruddock
(74) *Attorney, Agent, or Firm* — Sughrue Mion, PLLC

(57) ABSTRACT

Provided is a method with which a separator-integrated electrode having a shutdown function can be easily produced using a water-insoluble polymer. The method for producing a separator-integrated electrode disclosed here includes the steps of: preparing a coating liquid in which a water-insoluble polymer is dissolved in a mixed solvent containing a good solvent for the water-insoluble polymer and a poor solvent for the water-insoluble polymer and in which polyethylene particles are dispersed; coating the coating liquid on an electrode; and vaporizing and removing the mixed solvent from the coating liquid coated on the electrode. A boiling point of the poor solvent is higher than a boiling point of the good solvent. A porous separator layer is formed by removing the mixed solvent through vaporization and thereby forming pores.

2 Claims, 2 Drawing Sheets

(56) References Cited

U.S. PATENT DOCUMENTS

2020/0044217 A1    2/2020  Minakuchi et al.
2020/0350574 A1*  11/2020  Ha .................... H01M 50/46

FOREIGN PATENT DOCUMENTS

| | | |
|---|---|---|
| JP | 2006-179205 A | 7/2006 |
| JP | 2006-331759 A | 12/2006 |
| JP | 2017-025294 A | 2/2017 |
| JP | 2020-24811 A | 2/2020 |
| KR | 10-2016-0065692 A | 6/2016 |

* cited by examiner

METHOD FOR PRODUCING SEPARATOR-INTEGRATED ELECTRODE

BACKGROUND OF THE INVENTION

1. Field of the Invention

The present disclosure relates to a method for producing a separator-integrated electrode. This application claims priority on the basis of Japanese Patent Application No. 2020-047783, which was filed on Mar. 18, 2020, and the entire contents of that application are incorporated by reference in this specification.

2. Description of the Related Art

Typically, secondary batteries such as lithium secondary batteries include an electrode body having a positive electrode, a negative electrode and a separator that insulates the positive electrode from the negative electrode. Porous bodies made of water-insoluble polymers are commonly used in separators so as to allow permeation of an electrolyte solution.

Separators require a so-called shutdown function in addition to the function of insulating a positive electrode from a negative electrode. The shutdown function is a function whereby when the temperature of a battery rapidly increases as a result of a short circuit or the like, pores in the separator close up and ion permeation (in other words, current) is interrupted. In general, polyolefin porous films that have been monoaxially stretched or biaxially stretched are used as separators having a shutdown function (for example, see Japanese Patent Application Publication No. 2017-025294).

SUMMARY OF THE INVENTION

However, in a case where a polyolefin porous film is used in a separator, a procedure for stacking the separator on an electrode with high precision is required when producing an electrode body. Therefore, such a case has the drawback that production of an electrode body is not simple.

Meanwhile, separator-integrated electrodes in which a separator layer is provided on an electrode are known. Such separator-integrated electrodes have the advantage of facilitating production of electrode bodies. However, there has been insufficient development of methods for producing separator-integrated electrodes having a shutdown function using simple methods.

Hence, the object of the present disclosure is to provide a method with which a separator-integrated electrode having a shutdown function can be easily produced using a water-insoluble polymer.

The method for producing a separator-integrated electrode disclosed here includes the steps of: preparing a coating liquid in which a water-insoluble polymer is dissolved in a mixed solvent containing a good solvent for the water-insoluble polymer and a poor solvent for the water-insoluble polymer and in which polyethylene particles are dispersed; coating the coating liquid on an electrode; and vaporizing and removing the mixed solvent from the coating liquid coated on the electrode. A boiling point of the poor solvent is higher than a boiling point of the good solvent. A porous separator layer is formed by removing the mixed solvent through vaporization and thereby forming pores.

Provided by such a configuration is a method with which a separator-integrated electrode having a shutdown function can be easily produced using a water-insoluble polymer.

DESCRIPTION OF THE PREFERRED EMBODIMENTS

Figure 1:
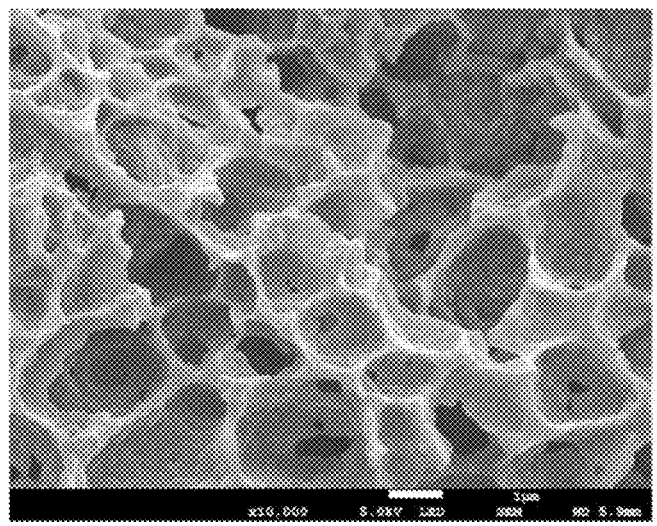
FIG. 1 is a SEM photograph of a cross section of a separator layer of a separator-integrated electrode obtained in Comparative Example 1.

The method for producing a separator-integrated electrode of the present disclosure includes a step of preparing a coating liquid in which a water-insoluble polymer is dissolved in a mixed solvent containing a good solvent for the water-insoluble polymer and a poor solvent for the water-insoluble polymer and in which polyethylene particles are dispersed (hereinafter referred to as a "coating liquid preparation step"); a step of coating the coating liquid on an electrode (hereinafter referred to as a "coating liquid coating step"); and a step of vaporizing and removing the mixed solvent from the coating liquid coated on the electrode (hereinafter referred to as a "mixed solvent removal step"). Here, a boiling point of the poor solvent is higher than a boiling point of the good solvent. In the mixed solvent removal step, a porous separator layer is formed by removing the mixed solvent through vaporization and thereby forming pores.

First, an explanation will be given of the coating liquid preparation step. In the present disclosure, the "good solvent for the water-insoluble polymer" is a solvent in which the solubility of the water-insoluble polymer at 25° C. is 1 mass % or more. The solubility of the water-insoluble polymer in the good solvent at 25° C. is desirably 2.5 mass % or more, more desirably 5 mass % or more, further desirably 7.5 mass % or more, and most desirably 10 mass % or more. It should be noted that the type of good solvent to be used in the present disclosure is selected, as appropriate, according to the type of water-insoluble polymer. It is possible to use a single good solvent in isolation or a mixed solvent obtained by mixing two or more types of good solvents.

In the present disclosure, the "poor solvent for the water-insoluble polymer" is a solvent in which the solubility of the water-insoluble polymer at 25° C. is less than 1 mass %. The solubility of the water-insoluble polymer in the poor solvent at 25° C. is desirably 0.5 mass % or less, more desirably 0.2 mass % or less, further desirably 0.1 mass % or less, and most desirably 0.05 mass % or less. The type of poor solvent to be used in the present disclosure is selected, as appropriate, according to the type of water-insoluble polymer. It is possible to use a single poor solvent in isolation or a mixed solvent obtained by mixing two or more types of poor solvents.

It is possible to use Hansen solubility parameters (HSP) in order to assess whether a specific solvent is a good solvent or a poor solvent for a specific polymer compound. For example, if the dispersion term, polarity term and hydrogen bonding term of the HSP of the polymer compound are denoted by $\delta_{D1}$, $\delta_{P1}$ and $\delta_{H1}$ respectively and the dispersion term, polarity term and hydrogen bonding term of the HSP of the solvent are denoted by $\delta_{D2}$, $\delta_{P2}$ and $\delta_{H2}$ respectively, the solubility of the polymer compound tends to increase as the distance $Ra(MPa^{1/2})$ between the HSP of the polymer compound and that of the solvent, as represented by the formula below, decreases.

$$Ra^2 = 4(\delta_{D1}-\delta_{D2})^2 + (\delta_{P1}-\delta_{P2})^2 + (\delta_{H1}-\delta_{H2})^2$$

In addition, if the interaction radius of the specific polymer compound is denoted by $R_0$, it is predicted that the polymer compound will be soluble if the ratio $Ra/R_0$ is less than 1, partially soluble if the ratio $Ra/R_0$ is 1, and insoluble if the ratio $Ra/R_0$ is greater than 1.

Alternatively, it is possible to assess easily whether a specific solvent is a good solvent or a poor solvent for a specific polymer compound by carrying out a test involving mixing the polymer compound and the solvent in a sample bottle or the like.

The good solvent and the poor solvent are mixed and used as a homogeneous solvent. Therefore, the good solvent and the poor solvent are compatible with each other. In the present disclosure, the boiling point of the poor solvent being used is higher than the boiling point of the good solvent being used. From the perspective of enabling a homogeneous porous body having a relatively high porosity to be obtained easily, the boiling point of the poor solvent is desirably at least 10° C. higher, and more desirably at least 90° C. higher, than the boiling point of the good solvent. From the perspective of drying speed, the boiling point of the poor solvent is desirably lower than 300° C.

In the present disclosure, the term "water-insoluble polymer" means a polymer that has a solubility in water of less than 1 mass % at 25° C. The solubility of the water-insoluble polymer in water at 25° C. is desirably 0.5 mass % or less, more desirably 0.2 mass % or less, and further desirably 0.1 mass % or less.

The "water-insoluble polymer" used in the coating liquid preparation step is the same as the water-insoluble polymer that constitutes the separator layer. A polymer for which a good solvent and a poor solvent exist is used as the water-insoluble polymer. The type of water-insoluble polymer to be used is not particularly limited as long as a good solvent and a poor solvent for the polymer exist. Examples of water-insoluble polymers include olefin-based resins such as polyethylene and polypropylene; fluorine-based resins such as poly(vinyl fluoride), poly(vinylidene fluoride) and vinylidene fluoride-hexafluoropropylene copolymers; (meth)acrylic-based resins such as poly(methyl (meth)acrylate) and poly(ethyl (meth)acrylate); styrene-based resins such as polystyrene, styrene-acrylonitrile copolymers and acrylonitrile-butadiene-styrene copolymers; water-insoluble cellulose derivatives such as ethyl cellulose, cellulose acetate and cellulose propionate; vinyl chloride-based resins such as poly(vinyl chloride) and ethylene-vinyl chloride copolymers; and ethylene-vinyl alcohol copolymers. It is possible to use a polymer that has been rendered water-insoluble through modification of a water-soluble polymer. Of these, the water-insoluble polymer is desirably an aliphatic polymer compound (that is, a polymer compound having no aromatic ring) from the perspectives of usefulness of a porous body of the water-insoluble polymer and usefulness of a method for producing same. From the perspective of enabling a homogeneous porous body having a relatively high porosity to be obtained easily, the water-insoluble polymer is desirably an addition polymerization type polymer compound (that is, a polymer compound produced by polymerization of an ethylenically unsaturated double bond in a monomer having the ethylenically unsaturated double bond; for example, a vinyl-based polymer or vinylidene-based polymer). From the perspective of obtaining characteristics particularly suitable for a separator, the water-insoluble polymer is more desirably a vinylidene fluoride-hexafluoropropylene copolymer or an ethylene-vinyl alcohol copolymer, and is most desirably a vinylidene fluoride-hexafluoropropylene copolymer. A case where a separator-integrated electrode is formed using a vinylidene fluoride-hexafluoropropylene copolymer has advantages such as adhesion of a separator layer to an electrode being high, and a layering procedure and winding procedure for producing an electrode body being easy to implement.

The average degree of polymerization of the water-insoluble polymer is not particularly limited, but is desirably not less than 70 and not more than 500,000, and more desirably not less than 100 and not more than 200,000. It should be noted that the average degree of polymerization of the water-insoluble polymer can be determined using a publicly known method (for example, NMR measurements) or the like.

Suitable good solvents and suitable poor solvents will now be explained in more detail using specific water-insoluble polymers as examples. The production method of the present disclosure can be advantageously carried out by using the good solvents and poor solvents explained below with the water-insoluble polymers given below. Moreover, it is possible to use one of the good solvents listed below in isolation, or a combination of two or more types thereof. It is possible to use one of the poor solvents listed below in isolation, or a combination of two or more types thereof.

1. Case where Water-Insoluble Polymer is Vinylidene Fluoride-Hexafluoropropylene Copolymer A vinylidene fluoride-hexafluoropropylene copolymer (P(VDF-HFP)) is a copolymer that contains vinylidene fluoride units and hexafluoropropylene units as monomer units. The copolymerization ratio of these units is not particularly limited, and should be decided as appropriate in view of separator characteristics. Vinylidene fluoride-hexafluoropropylene copolymers can be obtained through synthesis in accordance with publicly known methods, and can also be obtained as commercially available products (for example, Kynar FLEX 2850-00, 2800-00, 2800-20, 2750-01, 2500-20, 3120-50, 2851-00, 2801-00, 2821-00, 2751-00 and 2501-00 produced by Arkema Group).

Examples of suitable good solvents for the P(VDF-HFP) include ketones such as acetone and methyl ethyl ketone; cyclic ethers such as tetrahydrofuran; nitrogen-containing polar solvents (particularly, nitrogen-containing aprotic polar solvents) such as N,N-dimethylformamide, N,N-dimethylacetamide and N-methylpyrrolidone; and sulfur-containing polar solvents (particularly, sulfur-containing aprotic polar solvents) such as DMSO. From the perspective of ease of removal through vaporization, the good solvent is desirably acetone, methyl ethyl ketone or tetrahydrofuran, and more desirably acetone.

Examples of suitable poor solvents for the P(VDF-HFP) include water and alcohols such as 1-hexanol, 1,3-butane diol, 1,4-butane diol, 1,5-pentane diol, 1,6-hexane diol and glycerin. From perspectives such as placing little burden on the environment, ease of procurement and ease of handling, water is desired as the poor solvent.

2. Case where Water-Insoluble Polymer is Ethylene-Vinyl Alcohol Copolymer

An ethylene-vinyl alcohol copolymer (EVOH) is a copolymer containing ethylene units and vinyl alcohol units as monomer units. The content of ethylene units in the EVOH is not particularly limited, but is desirably 10 mol % or more, more desirably 15 mol % or more, further desirably 20 mol % or more, and particularly desirably 25 mol % or more. On the other hand, the content of ethylene units in the EVOH is desirably 60 mol % or less, more desirably 50 mol % or less, and further desirably 45 mol % or less. The degree of saponification of the EVOH is not particularly limited, but is desirably 80 mol % or more, more desirably 90 mol % or more, and further desirably 95 mol % or more. The upper limit for the degree of saponification is determined by technical limitations relating to saponification and is, for example, 99.99 mol %. It should be noted that the content of ethylene units and the degree of saponification in the EVOH can be determined using a publicly known method (for example, $^1$H-NMR measurements or the like).

In addition, EVOHs are generally produced by saponifying copolymers of ethylene and vinyl esters using an alkali catalyst or the like. As a result, EVOHs can contain vinyl ester units. Vinyl esters in such units are typically vinyl acetate, and may also be vinyl formate, vinyl propionate, vinyl valerate, vinyl caprate, vinyl laurate, and the like. In addition to ethylene units, vinyl alcohol units and vinyl ester units, the EVOH may also contain other monomer units as long as the advantageous effect of the present disclosure is not significantly impaired.

Examples of suitable good solvents for the EVOH include dimethyl sulfoxide (DMSO) and mixed solvents of water and alcohols. The alcohol used in the mixed solvent is desirably propyl alcohol. The propyl alcohol may be n-propyl alcohol or isopropyl alcohol. Therefore, a particularly suitable good solvent is DMSO or a mixed solvent of water and propyl alcohol.

Examples of suitable poor solvents for the EVOH include water; alcohols; cyclic esters such as γ-butyrolactone; cyclic carbonates such as propylene carbonate; cyclic sulfones such as sulfolane; ether group-containing monools such as propylene glycol monomethyl ether, propylene glycol monoethyl ether, diethylene glycol monomethyl ether, diethylene glycol monoethyl ether and 2-ethoxyethanol; and diols such as 1,3-butane diol, 1,4-butane diol, 1,5-pentane diol and 1,6-hexane diol. Of these, cyclic esters, cyclic carbonates, cyclic sulfones and ether group-containing monools are desired, γ-butyrolactone, propylene carbonate, sulfolane and ether group-containing monools are more desired, and γ-butyrolactone and sulfolane are further desired. The solubility parameter (Hildebrand SP value) δ of the poor solvent is desirably at least 1.6 MPa$^{1/2}$ higher than the solubility parameter δ of the EVOH.

It should be noted that in the case of EVOH, water and alcohols are poor solvents for EVOH, but a mixed solvent of water and an alcohol (particularly, propyl alcohol) is a good solvent. Here, a mixed solvent of water and an alcohol can be regarded as a mixed solvent of a mixture of an alcohol and a reduced amount of water, which is a good solvent, with water, which is a poor solvent having a higher boiling point than this, and it is therefore possible to use only a mixed solvent of water and an alcohol in the preparation of an EVOH solution. Therefore, in the present disclosure, in cases where a solvent obtained by mixing two or more types of poor solvent for a specific water-insoluble polymer becomes a good solvent, it is possible to use only this mixed solvent containing two or more types of poor solvent as a mixed solvent containing a good solvent for the water-insoluble polymer and a poor solvent for the water-insoluble polymer in order to prepare a solution.

3. Case where Water-Insoluble Polymer is Cellulose Acetate

Examples of suitable good solvents for cellulose acetate include nitrogen-containing polar solvents (particularly, nitrogen-containing aprotic polar solvents) such as N,N-dimethylformamide, N,N-dimethylacetamide and N-methylpyrrolidone; esters such as methyl formate and methyl acetate; ketones such as acetone and cyclohexanone; cyclic ethers such as tetrahydrofuran, dioxane and dioxolane; glycol derivatives such as methyl glycol and methyl glycol acetate; halogenated hydrocarbons such as methylene chloride, chloroform and tetrachloroethane; cyclic carbonates such as propylene carbonate; and sulfur-containing polar solvents (particularly, sulfur-containing aprotic polar solvents) such as DMSO. Of these, a sulfur-containing aprotic polar solvent is desired, and DMSO is more desired.

Examples of suitable poor solvents for cellulose acetate include alcohols such as 1-hexanol, 1,3-butane diol, 1,4-butane diol, 1,5-pentane diol and 1,6-hexane diol. A monohydric or dihydric alcohol having 4 to 6 carbon atoms is desired as the alcohol.

4. Case where Water-Insoluble Polymer is Poly(Vinylidene Fluoride)

Examples of suitable good solvents for poly(vinylidene fluoride) include nitrogen-containing polar solvents (particularly, nitrogen-containing aprotic polar solvents) such as N,N-dimethylformamide, N,N-dimethylacetamide and N-methylpyrrolidone; and sulfur-containing polar solvents (particularly, sulfur-containing aprotic polar solvents) such as DMSO. Of these, a nitrogen-containing aprotic polar solvent is desired, and N,N-dimethylformamide is more desired.

Examples of suitable poor solvents for poly(vinylidene fluoride) include alcohols such as 1-hexanol, 1,3-butane diol, 1,4-butane diol, 1,5-pentane diol, 1,6-hexane diol and glycerin; and cyclic ethers such as tetrahydrofuran, dioxane and dioxolane. A dihydric or trihydric alcohol having 3 to 6 carbon atoms is desired as the alcohol.

The usage quantities of the water-insoluble polymer, the good solvent and the poor solvent may be selected, as appropriate, according to the types thereof being used. The mixing amount of the water-insoluble polymer is desirably 1 part by mass or more, more desirably 5 parts by mass or more, and further desirably 10 parts by mass or more, relative to 100 parts by mass of the good solvent. On the other hand, the mixing amount of the water-insoluble polymer is desirably 40 parts by mass or less, more desirably 35 parts by mass or less, and further desirably 30 parts by mass or less, relative to 100 parts by mass of the good solvent. The mixing amount of the poor solvent is desirably 3 parts by mass or more, more desirably 5 parts by mass or more, and further desirably 10 parts by mass or more, relative to 100 parts by mass of the good solvent. On the other hand, the mixing amount of the poor solvent is desirably 400 parts by mass or less, more desirably 200 parts by mass or less, and further desirably 100 parts by mass or less, relative to 100 parts by mass of the good solvent. By altering these amounts, it is possible to control the state of pores (for example, porosity, pore diameter, and the like) in an obtained porous body.

The coating liquid contains polyethylene particles. The polyethylene particles are dispersed in the coating liquid without being dissolved in the mixed solvent. When the temperature of a battery rapidly increases as a result of a short circuit or the like, the polyethylene particles soften or melt, thereby enabling pores in the separator layer of the separator-integrated electrode to close up. Therefore, the polyethylene particles impart the separator-integrated electrode with a shutdown function. In addition, by forming the separator layer of the separator-integrated electrode from the coating liquid that contains polyethylene particles, it is possible to suppress formation of a pore-free layer (a so-called skin layer) at the surface of the separator layer. Polyethylene particles generally have a lower specific gravity than inorganic particles, and therefore exhibit a superior skin layer formation suppression effect than inorganic particles.

It is known that polyethylene can have a variety of densities. The density of the polyethylene that constitutes the polyethylene particles used in the present disclosure is not particularly limited. Examples of this polyethylene include very low density polyethylene (VLDPE), low density polyethylene (LDPE), medium density polyethylene (M-DPE), high density polyethylene (HDPE) and linear low density polyethylene (LLDPE). It should be noted that for matters relating to classification of these types, see JIS K 6922-1: 1997. From the perspective of handleability, the density of the polyethylene that constitutes the polyethylene particles used in the present disclosure is desirably 0.90 g/cm$^3$ or more, more desirably 0.92 g/cm$^3$ or more, and further desirably 0.95 g/cm$^3$ or more. It should be noted that the upper limit of the density of the polyethylene depends on technical limitations, and may be 0.99 g/cm$^3$ or less.

It is known that polyethylene can have a variety of melting points and softening points. The melting point and softening point of the polyethylene that constitutes the polyethylene particles used in the present disclosure are not particularly limited, and may be selected as appropriate in view of the required shutdown temperature. The softening point of the polyethylene that constitutes the polyethylene particles used in the present disclosure is desirably not less than 110° C. and not more than 140° C., and more desirably not less than 125° C. and not more than 135° C. It should be noted that the softening point of the polyethylene can be measured using, for example, a ring and ball method in accordance with JIS K 2207:1996.

The average particle diameter of the polyethylene particles is not particularly limited. From the perspective of achieving a high skin layer formation suppression effect, the average particle diameter of the polyethylene particles is desirably 0.5 μm or more, more desirably 1 μm or more, and further desirably 2 μm or more. On the other hand, from the perspective of ease of obtaining a state in which the polyethylene particles are homogeneously dispersed in the separator layer, the average particle diameter of the polyethylene particles is desirably 10 μm or less, more desirably 6 μm or less, and further desirably 5 μm or less. It should be noted that the average particle diameter of these polyethylene particles can be determined using a call counter method. In cases where the average particle diameter of the polyethylene particles is small (for example, a case where the average particle diameter is 1.5 μm or less), the average particle diameter thereof can be determined using a Microtrac method.

The mixing amount of the polyethylene particles may be specified as appropriate in view of the porosity, average pore diameter, and the like, of a separator layer being produced so that a shutdown function can be exhibited. From the perspective of achieving a higher shutdown function, it is desirable for the mixing amount of the polyethylene particles to be high relative to the water-insoluble polymer. Therefore, the mixing amount of the polyethylene particles is desirably 50 parts by mass or more, more desirably 60 parts by mass or more, and further desirably 100 parts by mass or more, relative to 100 parts by mass of the water-insoluble polymer. On the other hand, from the perspectives of suppressing an increase in viscosity of the coating liquid and enabling uniform dispersion of the polyethylene particles, the mixing amount of the polyethylene particles is desirably low relative to the water-insoluble polymer. Therefore, the mixing amount of the polyethylene particles is desirably 500 parts by mass or less, more desirably 400 parts by mass or less, and further desirably 300 parts by mass or less, relative to 100 parts by mass of the water-insoluble polymer.

In the coating liquid preparation step, the polyethylene particles may be in a solid form or in the form of a dispersion. In cases where a dispersion of polyethylene particles is used, the dispersion medium is desirably either of the good solvent for the water-insoluble polymer or the poor solvent for the water-insoluble polymer.

In cases where a dispersion of polyethylene particles is used, the viscosity thereof is not particularly limited, but is desirably 10,000 mPa·s or less, more desirably 5000 mPa·s or less, and further desirably 3000 mPa·s or less. The viscosity of the dispersion of polyethylene particles can be determined by, for example, measuring the viscosity using a B type viscometer at a temperature of 25° C. and a speed of rotation of 6 rpm.

In addition to the water-insoluble polymer, the mixed solvent and the polyethylene particles, the coating liquid may further contain other components as long as the advantageous effect of the present disclosure is not significantly impaired.

The method for preparing the coating liquid is not particularly limited. In a desired method for preparing the coating liquid, a solution is first prepared by dissolving the water-insoluble polymer in a mixed solvent of a good solvent and a poor solvent using a publicly known method. When preparing this solution, it is possible to dissolve the water-insoluble polymer in the good solvent, add the poor solvent thereto, and then homogeneously mix them. It is also possible to add the water-insoluble polymer to the mixed solvent of the good solvent and the poor solvent so as to dissolve the water-insoluble polymer. This solution can be prepared using a publicly known stirring device, mixing device, or the like. When preparing this solution, it is possible to irradiate with ultrasonic waves, carry out heating, or the like. The heating temperature is, for example, not less than 40° C. and not more than 100° C. It is possible to prepare the solution of the water-insoluble polymer by heating, and then cool the solution in such a way that the good solvent and the poor solvent do not separate. In addition, this cooling is desirably carried out so that the water-insoluble polymer does not precipitate. This is because precipitated water-insoluble polymer can be an impurity.

Next, a coating liquid is prepared by dispersing the polyethylene particles in the solvent using a publicly known method. More specifically, the coating liquid can be prepared by mixing the polyethylene particles and the solution of the water-insoluble polymer, and dispersing the polyethylene particles in the solution of the water-insoluble polymer, with a publicly known mixing apparatus (for example, a homogenizer, a homodisper, a planetary mixer, an ultrasonic disperser, a pigment disperser or a ball mill).

In cases where the polyethylene particles are used in the form of a dispersion, the coating liquid may be prepared by mixing the water-insoluble polymer, the good solvent, the poor solvent and the dispersion of polyethylene particles, and stirring until the water-insoluble polymer dissolves.

Next, an explanation will now be given of the coating liquid coating step. Electrodes of publicly known batteries can be used without limitation as the electrode used in the coating liquid coating step.

As one example, an explanation will now be given of a case in which the electrode is an electrode of a lithium secondary battery. Typically, electrodes of lithium secondary batteries include a sheet-shaped current collector and an active substance layer provided on the current collector.

In a case where the electrode is a positive electrode, the positive electrode typically includes a sheet-shaped positive electrode current collector and a positive electrode active substance layer provided on the positive electrode current collector. The positive electrode active substance layer is provided on one surface or both surfaces of the positive electrode current collector, and desirably on both surfaces of the positive electrode current collector.

For example, an aluminum foil or the like can be used as the positive electrode current collector.

The positive electrode active substance layer contains a positive electrode active substance. Lithium-transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and lithium-transition metal phosphate compounds (for example, $LiFePO_4$ and the like) can be given as examples of the positive electrode active substance.

The positive electrode active substance layer can contain components other than the active substance, such as an electrically conductive material or a binder.

Carbon black such as acetylene black (AB) and other carbon materials (for example, graphite or the like) can be advantageously used as an electrically conductive material.

For example, poly(vinylidene fluoride) (PVdF) or the like can be used as a binder.

In a case where the electrode is a negative electrode, the negative electrode typically includes a sheet-shaped negative electrode current collector and a negative electrode active substance layer provided on the negative electrode current collector. The negative electrode active substance layer is provided on one surface or both surfaces of the negative electrode current collector, and desirably on both surfaces of the negative electrode current collector.

For example, a copper foil or the like can be used as the negative electrode current collector.

The negative electrode active substance layer contains a negative electrode active substance. For example, a carbon material such as graphite, hard carbon or soft carbon can be used as the negative electrode active substance. The graphite can be natural graphite or artificial graphite, and may be amorphous carbon-coated graphite in a form whereby graphite is coated with an amorphous carbon material.

The negative electrode active substance layer can contain components other than the active substance, such as a binder or a thickening agent.

For example, a styrene-butadiene rubber (SBR) or the like can be used as a binder.

For example, carboxymethyl cellulose (CMC) or the like can be used as a thickening agent.

The electrode may be a positive electrode or a negative electrode. Because the negative electrode active substance layer has a larger area than the positive electrode active substance layer in the lithium secondary battery, it is desirable to provide the separator layer on the negative electrode active substance layer. Therefore, the electrode used in the coating liquid coating step is desirably a negative electrode.

In the coating liquid coating step, the thus prepared coating liquid is coated on an electrode. In the case of the lithium secondary battery electrode explained above, the coating liquid is coated on an active substance layer of the electrode.

The coating method is not particularly limited. The coating liquid can be coated using a publicly known coating apparatus, such as a die coater, a slit coater, a comma coater, a gravure coater or a bar coater.

The coating amount should be decided as appropriate in view of the desired thickness of the separator layer and the solid content concentration in the coating liquid.

It should be noted that the coating liquid coated in the coating liquid coating step is a solution of the water-insoluble polymer, and phase separation does not occur in the coating liquid. Therefore, the turbidity of a measurement solution obtained by removing the polyethylene particles from the coating liquid is generally 50 NTU or less, as measured using a nephelometer.

Next, an explanation will be given of the mixed solvent removal step. In the mixed solvent removal step, the good solvent and the poor solvent are removed by vaporization (particularly, volatilization). A porous skeleton of the water-insoluble polymer is formed in this mixed solvent removal step. The polyethylene particles are incorporated in the porous skeleton of the water-insoluble polymer. In this mixed solvent removal step, a porous separator layer is formed through formation of pores as a result of the procedure for removing the mixed solvent, and more specifically as a result of vaporization of the poor solvent. Typically, pores are formed by, for example, phase separation between the water-insoluble polymer and the mixed solvent in which the poor solvent has become highly concentrated. Specifically, because the poor solvent has a higher boiling point than the good solvent, the good solvent is preferentially vaporized ahead of the poor solvent in this step. As the amount of good solvent decreases, the concentration of the poor solvent in the mixed solvent increases. Because the solubility of the water-insoluble polymer in the poor solvent is lower than in the good solvent, phase separation occurs between the water-insoluble polymer and the mixed solvent in which the poor solvent has become highly concentrated, and a porous skeleton of the water-insoluble polymer is formed. This phase separation may be spinodal decomposition. Finally, the good solvent is removed, the water-insoluble polymer is precipitated, the high boiling point poor solvent is removed through vaporization, and pores are produced. Formed in this way is a separator layer which is a porous body of the water-insoluble polymer and in which polyethylene particles are incorporated. It should be noted that the type and usage quantity of the good solvent and the type and usage quantity of the poor solvent may be appropriately selected in order to cause phase separation between the water-insoluble polymer and the mixed solvent in which the poor solvent has become highly concentrated.

Examples of methods for vaporizing the mixed solvent of the good solvent and the poor solvent include methods involving heating, methods involving leaving in a vacuum, methods involving heating under reduced pressure and methods involving air drying. These methods can be carried out in the same way as publicly known drying methods. From the perspective of ease of carrying out the procedure, a method involving heating is desired. The heating temperature is not particularly limited, and may be decided, as appropriate, according to the type of solvent and the heating time. The heating temperature is desirably a temperature at which the mixed solvent does not boil, the polyethylene particles do not soften and the water-insoluble polymer and the poor solvent do not decompose. The heating temperature is, for example, 25° C. or higher, desirably 30° C. or higher, more desirably 50° C. or higher, and further desirably 70° C. or higher. On the other hand, the heating temperature is, for example, a temperature that is at least 10° C. lower than the softening point of the polyethylene particles and more specifically is, for example, lower than 110° C., desirably 100° C. or lower, and more desirably 90° C. or lower. In cases where a highly volatile solvent is used, the heating temperature may be approximately not less than 30° C. and not more than 60° C. The heating time may be decided, as appropriate, according to the type of solvent and the heating temperature. It is desirable for the electrode on which the coating liquid has been coated to remain still while the good solvent and the poor solvent are vaporized.

A separator-integrated electrode can be obtained in the manner described above. The separator layer has a three dimensional network-like porous structure in which pores are connected from one main surface of the separator layer to the opposing main surface. In the present disclosure, the porosity of the formed separator layer increases because the coating liquid contains polyethylene particles. This is thought to be because polyethylene particles act as phase separation nuclei, thereby facilitating phase separation. According to the production method of the present disclosure, it is possible to obtain a separator-integrated electrode in which the porosity of a separator layer is, for example, 40% or more (particularly, 50% or more, 60% or more or even 70% or more) and 90% or less (particularly, less than 85%). It should be noted that the porosity can be calculated in accordance with a publicly known method using the true density and the apparent density.

In the present disclosure, procedures for carrying out the coating liquid preparation step, the coating liquid coating step and the mixed solvent removal step are very simple. Therefore, it can be understood that according to the present disclosure, a separator-integrated electrode having a shutdown function can be easily produced using a water-insoluble polymer.

A separator-integrated electrode produced in the manner described above can be used in a variety of batteries according to publicly known methods.

A lithium secondary battery is desired as a battery, and such lithium secondary batteries can be advantageously used as portable power sources for personal computers, handheld devices, and the like, and as motive power sources for vehicles such as electric vehicles (EV), hybrid vehicles (HV) and plug-in hybrid vehicles (PHV).

EXAMPLES

Explanations will now be given of examples relating to the present disclosure, but it is not intended that the present disclosure is limited to these examples.

Example 1

An ethylene-vinyl alcohol copolymer ("Eval L171B" produced by Kuraray Co., Ltd.; ethylene content: 27 mol %; hereinafter abbreviated to "EVOH") was used as the water-insoluble polymer, a mixed solvent of water and n-propyl alcohol (nPA) was used as the good solvent, and γ-butyrolactone (GBL) was used as the poor solvent.

The EVOH, water, nPA, GBL and an aqueous dispersion of polyethylene particles ("Chemipearl W300" produced by Mitsui Chemicals, Inc.) were added to a sample bottle such that the components were present at the quantities shown in Table 1. A coating liquid in which polyethylene particles were dispersed was obtained by heating the sample bottle to 70° C. to 80° C. and stirring until the EVOH completely dissolved in the solvents.

A negative electrode paste was prepared by mixing graphite (C) ("SMG-TH5" produced by Hitachi Chemical Co., Ltd.) as a negative electrode active substance, a styrene butadiene rubber (SBR) ("TRD 104B" produced by JSR Corporation) as a binder and carboxymethyl cellulose (CMC) ("MAC800LC" produced by Nippon Paper Industries Co., Ltd.) as a thickening agent with ion exchanged water at quantities whereby the C:SBR:CMC mass ratio was 98:1:1. This negative electrode paste was coated in a band-like shape on both surfaces of a long strip-shaped copper foil, dried, and then pressed. A negative electrode sheet having a negative electrode active substance layer formed on a copper foil was obtained in this way. The thickness of the negative electrode active substance layer on each surface was 66 μm, and the coating weight on each surface was 3.30 mg/cm$^2$.

The coating liquid was cooled to 25° C. and coated on the negative electrode active substance layer of the negative electrode sheet by means of casting. At this time, the coating thickness was 100 μm to 200 μm.

A separator-integrated electrode was obtained by placing this in a drying oven set to 100° C. and vaporizing the good solvent and the poor solvent.

Comparative Example 1

A separator-integrated electrode was obtained using a similar method to that used in Example 1, except that the aqueous dispersion of polyethylene particles was not added and the added quantity of water was increased so that the water/nPA ratio was 3.5 mL/1.5 mL.

A cross section of the separator layer in the separator-integrated electrode obtained in Comparative Example 1 was observed using a scanning electron microscope (SEM). This SEM photograph is shown in FIG. 1.

Examples 2 to 9

EVOH, nPA, GBL, an aqueous dispersion of polyethylene particles shown in Table 1 and, when necessary, water were added to a sample bottle such that the components were present at the quantities shown in Table 1. A coating liquid in which polyethylene particles were dispersed was obtained by heating the sample bottle to 70° C. to 80° C. and stirring until the EVOH completely dissolved in the solvents.

Separator-integrated electrodes were obtained in the same way as in Example 1 using these coating liquids. However, temperature of the drying oven was set to 80° C. when vaporizing the good solvent and the poor solvent in Examples 7 to 9.

Figure 2:
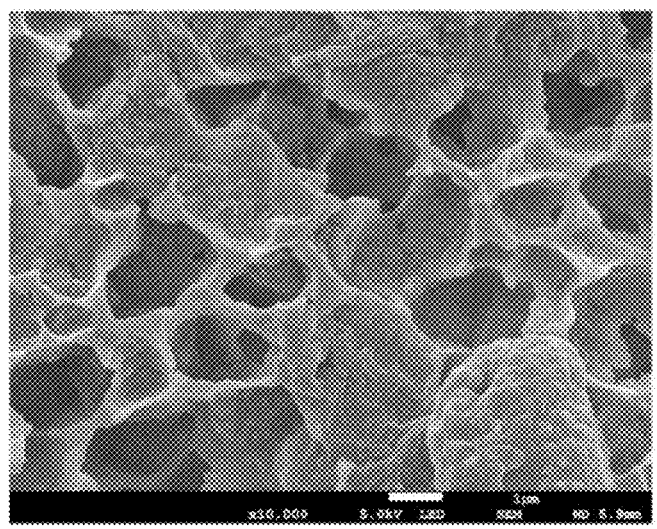
FIG. 2 is a SEM photograph of a cross section of a separator layer of a separator-integrated electrode obtained in Example 3.
Figure 3:
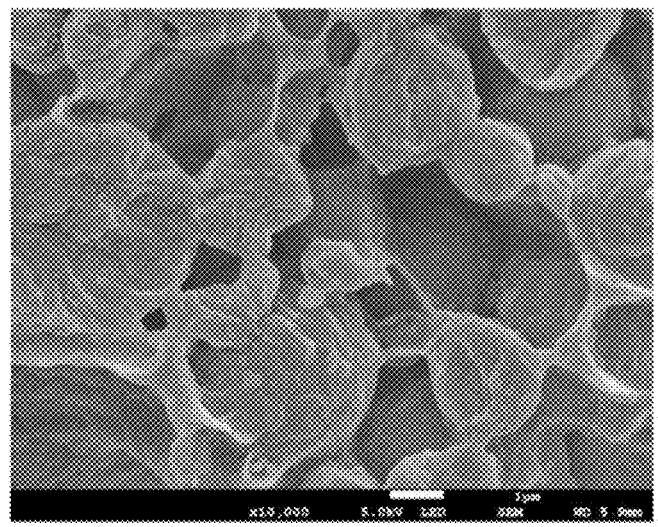
FIG. 3 is a SEM photograph of a cross section of a separator layer of a separator-integrated electrode obtained in Example 4.
Figure 4:
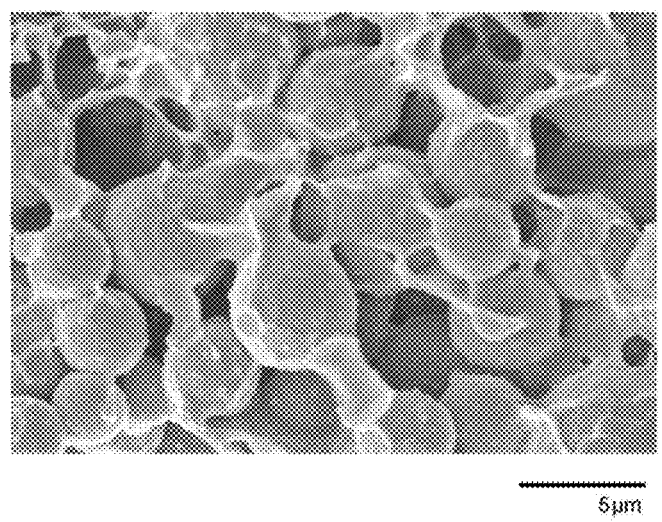
FIG. 4 is a SEM photograph of a cross section of a separator layer of a separator-integrated electrode obtained in Example 7.

In addition, a cross section of the separator layer in the separator-integrated electrodes in Examples 3, 4 and 7 were observed using a SEM. These SEM photographs are shown in FIGS. 2 to 4. By comparing FIG. 1 with FIGS. 2 to 4, It can be seen that polyethylene particles were incorporated in the porous skeleton of EVOH.

Example 10

A vinylidene fluoride-hexafluoropropylene copolymer ("Kynar-FLEX 2821-00" produced by Arkema Group; grade: powder type; hereinafter abbreviated to "P(VDF- HFP)") was used as the water-insoluble polymer, acetone was used as the good solvent, and water was used as the poor solvent.

The P(VDF-HFP), acetone and an aqueous dispersion of polyethylene particles ("Chemipearl W300" produced by Mitsui Chemicals, Inc.) were added to a sample bottle such that the components were present at the quantities shown in Table 1. A coating liquid in which polyethylene particles were dispersed was obtained by heating the sample bottle to 40° C. to 50° C. and stirring until the P(VDF-HFP) completely dissolved in the solvents.

A negative electrode sheet was obtained in the same way as in Example 1.

The coating liquid was cooled to 25° C. and coated on the negative electrode active substance layer of the negative electrode sheet by means of casting. At this time, the coating thickness was 100 μm to 200 μm.

A separator-integrated electrode was obtained by placing this in a drying oven set to 100° C. and vaporizing the good solvent and the poor solvent.

Comparative Example 2

A separator-integrated electrode was obtained using a similar method to that used in Example 10, except that the aqueous dispersion of polyethylene particles was not added and water was added at the quantity shown in Table 1.

Skin Layer Evaluation

An electrolyte solution was added dropwise to the surface of each of the separator-integrated electrodes obtained in the examples and comparative examples, and the speed with which the electrolyte solution permeated into the separator layer was evaluated visually. It should be noted that a non-aqueous electrolyte solution obtained by dissolving $LiPF_6$ at a concentration of 1.0 mol/L in a mixed solvent containing dimethyl carbonate (DMC), ethylene carbonate (EC) and ethyl methyl carbonate (EMC) at a volume ratio of 1:1:1 was used as the non-aqueous electrolyte solution. The results are shown in Table 1. It should be noted that a case where the electrolyte solution did not permeate means that a skin layer was formed at the surface of the separator layer. In addition, a case where the electrolyte solution permeated rapidly means that the degree of porosification of the surface layer part of the separator layer was high, that is, formation of a skin layer was suppressed to a high degree.

Shutdown Function Simulation Test

The separator-integrated electrodes obtained in the examples and comparative examples were placed in a drying oven set to a temperature of 140° C. to 150° C. and heated for approximately 10 minutes. After removing the separator-integrated electrodes from the drying oven, the separator layers were observed, and it was investigated whether or not pores had closed up.

A case where pores closed up across the entire surface of the separator layer was evaluated as "O", a case where pores closed up in a part of the separator layer was evaluated as "Δ", and a case where pores did not close up in the separator layer was evaluated as "X". The results are shown in Table 1.

TABLE 1

| | PE type | Average particle diameter | PE particles | EVOH | Good solvent (water/nPA) | Poor solvent (GBL) | Skin layer evaluation | Shutdown test |
|---|---|---|---|---|---|---|---|---|
| Comparative Example 1 | None | — | 0 | 1 g | 3.5 mL/1.5 mL | 2.1 mL | No permeation | X |
| Example 1 | W300 | 3 μm | 0.5 g | 1 g | 3.5 mL/1.5 mL | 2.1 mL | Slow permeation | Δ |
| Example 2 | W300 | 3 μm | 1 g | 1 g | 3.5 mL/1.5 mL | 2.1 mL | Slightly slow permeation | O |
| Example 3 | W300 | 3 μm | 1.7 g | 1 g | 3.5 mL/1.5 mL | 2.1 mL | Rapid permeation | O |
| Example 4 | W300 | 3 μm | 2.3 g | 1 g | 3.5 mL/1.5 mL | 2.1 mL | Rapid permeation | O |
| Example 5 | W700 | 1 μm | 1 g | 1 g | 3.5 mL/1.5 mL | 2.1 mL | Rapid permeation | O |
| Example 6 | W700 | 1 μm | 2.3 g | 1 g | 3.5 mL/1.5 mL | 2.1 mL | Rapid permeation | O |
| Example 7 | M200 | 6 μm | 1.9 g | 1 g | 3.5 mL/1.5 mL | 2.1 mL | Rapid permeation | O |
| Example 8 | A100 | 4 μm | 1.7 g | 1 g | 3.5 mL/1.5 mL | 2.1 mL | Rapid permeation | O |
| Example 9 | A400 | 4 μm | 1.7 g | 1 g | 3.5 mL/1.5 mL | 2.1 mL | Rapid permeation | O |

| | PE type | Average particle diameter | PE particles | P(VDF-HFP) | Good solvent (acetone) | Poor solvent (water) | | |
|---|---|---|---|---|---|---|---|---|
| Comparative Example 2 | None | — | 0 | 2 g | 12.5 mL | 1.5 mL | Rapid permeation | X |
| Example 10 | W300 | 3 μm | 1 g | 15 g | 12.5 mL | 1.5 mL | Rapid permeation | O |

W300: "Chemipearl W300" produced by Mitsui Chemicals, Inc., average particle diameter: 3 μm, solid content concentration: 40 mass %, viscosity (B type viscometer): 1000 mPa·s, polyethylene density: 0.97 g/cm$^3$, softening point (ring and ball method): 132° C.

W700: "Chemipearl W700" produced by Mitsui Chemicals, Inc., average particle diameter: 1 μm, solid content concentration: 40 mass %, viscosity (B type viscometer): 800 mPa·s, polyethylene density: 0.97 g/cm$^3$, softening point (ring and ball method): 132° C.

M200: "Chemipearl M200" produced by Mitsui Chemicals, Inc., average particle diameter: 6 μm, solid content concentration: 40 mass %, viscosity (B type viscometer): 5000 mPa·s, polyethylene density: 0.92 g/cm$^3$ A100: "Chemipearl A100" produced by Mitsui Chemicals, Inc., average particle diameter: 4 μm, solid content concentration: 40 mass %, viscosity (B type viscometer): 5000 mPa·s, polyethylene density: 0.89 g/cm$^3$ A400: "Chemipearl A400" produced by Mitsui Chemicals, Inc., average particle diameter: 4 μm, solid content concentration: 40 mass %, viscosity (B type viscometer): 8000 mPa·s, polyethylene density: 0.885 g/cm$^3$ From the results above, it can be understood that according to the present disclosure, a separator-integrated electrode having a shutdown function can be easily produced using a water-insoluble polymer.

What is claimed is:

1. A method for producing a separator-integrated electrode, the method comprising the steps of:
preparing a coating liquid in which a water-insoluble polymer is dissolved in a mixed solvent containing a good solvent for the water-insoluble polymer and a poor solvent for the water-insoluble polymer and in which polyethylene particles are dispersed;
coating the coating liquid on an electrode; and
vaporizing and removing the mixed solvent from the coating liquid coated on the electrode,
wherein
a boiling point of the poor solvent is higher than a boiling point of the good solvent,
a porous separator layer including the water-insoluble polymer and the polyethylene particles is formed by removing the mixed solvent through vaporization and thereby forming pores,
an average particle diameter of the polyethylene particles is not less than 1 μm and not more than 6 μm,
a mixing amount of the polyethylene particles is 50 parts by mass or more and 500 parts by mass or less relative to 100 parts by mass of the water-insoluble polymer, and
the water-insoluble polymer is an ethylene-vinyl alcohol copolymer or a vinylidene fluoride-hexafluoropropylene copolymer.

2. The method for producing a separator-integrated electrode according to claim 1, wherein a porosity of the separator layer is 40% or more and 90% or less.

* * * * *